United States Patent
Desai et al.

(10) Patent No.: US 10,824,766 B2
(45) Date of Patent: Nov. 3, 2020

(54) TECHNOLOGIES FOR AUTHENTICATED USB DEVICE POLICY ENFORCEMENT

(71) Applicant: Intel Corporation, Santa Clara, CA (US)

(72) Inventors: Soham Jayesh Desai, Atlanta, GA (US); Reshma Lal, Hillsboro, OR (US); Pradeep Pappachan, Hillsboro, OR (US); David Hines, Cameron Park, CA (US)

(73) Assignee: Intel Corporation, Santa Clara, CA (US)

(*) Notice: Subject to any disclaimer, the term of this patent is extended or adjusted under 35 U.S.C. 154(b) by 273 days.

(21) Appl. No.: 15/833,298

(22) Filed: Dec. 6, 2017

(65) Prior Publication Data

US 2019/0042800 A1 Feb. 7, 2019

(51) Int. Cl.
| | |
|---|---|
| *G06F 21/73* | (2013.01) |
| *G06F 13/20* | (2006.01) |
| *G06F 21/44* | (2013.01) |
| *G06F 13/40* | (2006.01) |
| *G06F 13/42* | (2006.01) |
| *G06F 21/85* | (2013.01) |
| *G06F 21/53* | (2013.01) |

(52) U.S. Cl.
CPC .............. *G06F 21/73* (2013.01); *G06F 13/20* (2013.01); *G06F 13/4068* (2013.01); *G06F 13/4282* (2013.01); *G06F 21/44* (2013.01); *G06F 21/53* (2013.01); *G06F 21/85* (2013.01); *G06F 2213/0042* (2013.01)

(58) Field of Classification Search
CPC ...... G06F 21/73; G06F 13/20; G06F 13/4068; G06F 13/4282; G06F 21/44; G06F 21/445; G06F 21/85; G06F 2213/0042
See application file for complete search history.

(56) References Cited

U.S. PATENT DOCUMENTS

| | | | |
|---|---|---|---|
| 2006/0218320 A1* | 9/2006 | Avraham ................ | G06F 21/55 710/62 |
| 2017/0140152 A1* | 5/2017 | Samsonov ............ | G06F 21/575 |

* cited by examiner

*Primary Examiner* — Shanto Abedin
*Assistant Examiner* — Kalu Kelly Emeaba
(74) *Attorney, Agent, or Firm* — Barnes & Thornburg LLP (57) ABSTRACT

Technologies for USB device policy enforcement include a computing device having a USB controller and secure enclave support. On boot, a firmware enclave randomly generates a binding identity and then securely provisions the binding identity to the USB controller. The firmware enclave also seals the binding identity to a policy enforcement enclave. At runtime, the policy enforcement enclave unseals the binding identity and includes the binding identity in a policy enforcement command sent to the USB controller. The USB controller verifies that the binding identity included in the command matches the binding identity that was previously provisioned. If the binding identities are successfully verified, the USB controller enforces the command. The USB controller may block data transfers or device configuration changes for one or more specified devices. Each of the firmware enclave and the policy enforcement enclave are trusted execution environments. Other embodiments are described and claimed.

18 Claims, 5 Drawing Sheets

TECHNOLOGIES FOR AUTHENTICATED USB DEVICE POLICY ENFORCEMENT

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. In particular, SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. Intel® SGX does not protect I/O data that moves across the on-chip boundary.

Trusted I/O (TIO) technology enables an application to send and/or receive I/O data securely to/from a device. In addition to the hardware that produces or consumes the I/O data, several software and firmware components in the I/O pipeline might also process the data. HCTIO (Hardware Cryptography-based Trusted I/O) is a technology that provides cryptographic protection of DMA data via an inline Crypto Engine (CE) in the system-on-a-chip (SoC). Channel ID, an identifier, uniquely identifies a DMA channel on the platform, and the CE filters DMA traffic and encrypts select I/O transactions upon a match with the Channel ID programmed in the CE. Certain devices may provide trusted I/O using an inline Channel ID filter in the SoC and a processor-based Crypto Engine (e.g., using microcode or other processor resources).

Many current computing devices include universal serial bus (USB) support, which allows peripheral devices to be connected to and disconnected from the computing device during operation (hotplugged). Typically, an operating system detects hotplug events, enumerates the connected devices, and loads corresponding device drivers. Certain USB devices and hosts may support a USB authentication protocol by which a host system may authenticate a targeted USB device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
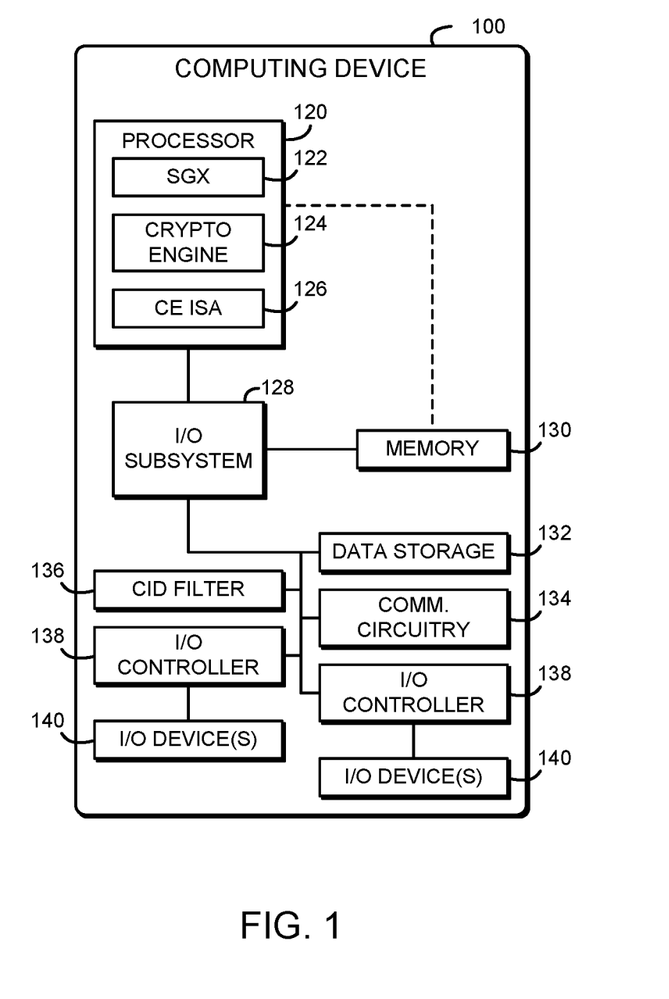
FIG. 1 is a simplified block diagram of at least one embodiment of a computing device for authenticated USB device policy enforcement.

Referring now to FIG. 1, an illustrative computing device 100 for authenticated USB device policy enforcement is shown. In use, as described further below, upon each boot a firmware secure enclave generates a binding identity and then securely provisions the binding identity to a USB controller. The firmware enclave also seals the binding identity to a policy enforcement enclave. At runtime, the policy enforcement enclave unseals the binding identity and includes the binding identity in each policy enforcement command sent to the USB controller. The USB controller verifies that the binding identity included in each policy enforcement command matches the binding identity that was previously provisioned. The computing device 100 thus allows trusted software to enforce device usage policies after a USB device is authenticated, even in the presence of untrusted software, such as the operating system. Additionally, the computing device 100 may ensure that only authorized software has the ability to restrict device USB. For example, only trusted software provided by an enterprise or other trusted authority may be capable of restricting device usage on the computing device 100.

The computing device 100 may be embodied as any type of device capable of performing the functions described herein. For example, the computing device 100 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 100 includes a processor 120, an I/O subsystem 128, a memory 130, a data storage device 132, a channel identifier (CID) filter 136, and one or more I/O controllers 138. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, a cryptographic engine 124, and a cryptographic engine instruction set architecture (ISA) 126. The secure enclave support 122 allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 130. The secure enclave support 122 may be embodied as a set of processor instruction extensions that allows the processor 120 to establish one or more secure enclaves in the memory 130. For example, the secure enclave support 122 may be embodied as Intel® Software Guard Extensions (SGX) technology.

The cryptographic engine 124 may be embodied as one or more hardware functional blocks (IP blocks), microcode, or other resources of the processor 120 that allows the processor 120 to perform trusted I/O (TIO) functions. For example, as described further below, the cryptographic engine 124 may perform TIO functions such as encrypting and/or decrypting DMA I/O data input from and/or output to one or more I/O devices 140. In particular, as described further below, in some embodiments, plaintext I/O data may be stored in a TIO Processor Reserved Memory (TIO PRM) region that is not accessible to software of the computing device 100, and the cryptographic engine 124 may be used to encrypt the plaintext DMA I/O data and copy the encrypted data to an ordinary kernel I/O buffer. The processor 120 may also include one or more range registers or other features to protect the TIO PRM from unauthorized access.

The cryptographic engine ISA 126 may be embodied as one or more processor instructions, model-specific registers, or other processor features that allows software executed by the processor 120 to securely program and otherwise use the cryptographic engine 124 and a corresponding CID filter 136, described further below. For example, the cryptographic engine ISA 126 may include a processor instruction to bind programming instructions or other data to the cryptographic engine 124, the CID filter 136, an I/O controller 138, and/or other components of the computing device 100, a processor instruction to unwrap the bound programming instructions and provide them to the target component over a sideband network or other secure fabric of the computing device 100, a processor instruction to securely copy and encrypt data from the TIO PRM region to an unprotected memory buffer, and/or other processor features.

The memory 130 may be embodied as any type of volatile or non-volatile memory or data storage capable of performing the functions described herein. In operation, the memory 130 may store various data and software used during operation of the computing device 100 such as operating systems, applications, programs, libraries, and drivers. As described further below, the memory 130 may also include the TIO PRM region. The memory 130 is communicatively coupled to the processor 120 via the I/O subsystem 128, which may be embodied as circuitry and/or components to facilitate input/output operations with the processor 120, the memory 130, and other components of the computing device 100. For example, the I/O subsystem 128 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 130 may be directly coupled to the processor 120, for example via an integrated memory controller hub. The I/O subsystem 128 may further include a sideband network, secure fabric, or other secure routing support. The secure routing support may include hardware support to ensure I/O data cannot be misrouted in the I/O subsystem 128 under the influence of rogue software. The secure routing support may be used with the CID filter 136 to provide cryptographic protection of I/O data. Additionally, in some embodiments, the I/O subsystem 128 may form a portion of a system-on-a-chip (SoC) and be incorporated, along with the processor 120, the memory 130, and other components of the computing device 100, on a single integrated circuit chip. Additionally or alternatively, in some embodiments the processor 120 may include an integrated memory controller and a system agent, which may be embodied as a logic block in which data traffic from processor cores and I/O devices converges before being sent to the memory 130.

The data storage device 132 may be embodied as any type of device or devices configured for short-term or long-term storage of data such as, for example, memory devices and circuits, memory cards, hard disk drives, solid-state drives, non-volatile flash memory, or other data storage devices. As described further below, the data storage device 132 may be used to store sealed binding identities or other data that may be accessed by secure enclaves of the computing device 100. The computing device 100 may also include a communications subsystem 134, which may be embodied as any communication circuit, device, or collection thereof, capable of enabling communications between the computing device 100 and other remote devices over a computer network (not shown). The communications subsystem 134 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The CID filter 136 may be embodied as any hardware component, functional block, logic, or other circuit that performs channel identifier (CID) filtering function(s), including filtering I/O transactions based on CIDs inserted by the I/O controllers 138. For example, the CID filter 136 may observe DMA transactions inline, perform test(s) based on the CID and memory address included in the transaction, and drop transactions that fail the test(s). In the illustrative embodiment, the CID filter 136 is included in an SoC with the processor 120 and I/O subsystem 128. In other embodiments, the CID filter 136 may be incorporated in one or more components such as the I/O subsystem 128.

Figure 2:
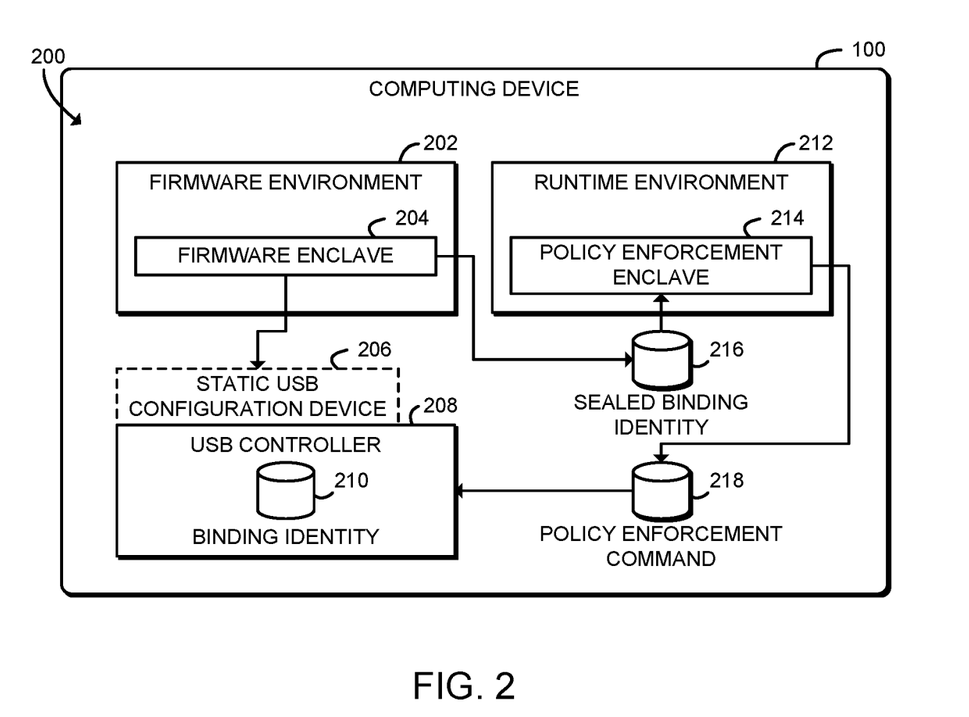
FIG. 2 is a simplified block diagram of at least one embodiment of an environment of the computing device of FIG. 1.

Each of the I/O controllers 138 may be embodied as any USB controller, embedded controller, microcontroller, microprocessor, functional block, logic, or other circuit or collection of circuits capable of performing the functions described herein. For example, the I/O controllers 138 may include one more USB controllers as shown in FIG. 2 and as discussed below. In some embodiments, one or more of the I/O controllers 138 may be embedded in another component of the computing device 100 such as the I/O subsystem 128 and/or the processor 120. Additionally or alternatively, one or more of the I/O controllers 138 may be connected to the I/O subsystem 128 and/or the processor 120 via an expansion bus such as PCI Express (PCIe) or other I/O connection. As described above, the I/O controllers 138 communicate with one or more I/O devices 140, for example over a peripheral communications bus (e.g., USB, Bluetooth, etc.). The I/O devices 140 may be embodied as any I/O device, such as USB devices, human interface devices, keyboards, mice, touch screens, microphones, cameras, and other input devices, as well as displays and other output devices. The I/O controllers 138 and associated DMA channels may be uniquely identified using identifiers called channel identifiers (CIDs). Each I/O controller 138 may assert an appropriate CID with every trusted I/O DMA transaction, for example as part of a transaction layer packet (TLP) prefix, to uniquely identify the source of the DMA transaction and provide liveness protections. The CID also enables the isolation of I/O from different devices 140.

Referring now to FIG. 2, in an illustrative embodiment, the computing device 100 establishes an environment 200 during operation. The illustrative environment 200 includes a firmware environment 202, a USB controller 208, and a runtime environment 212. The various components of the environment 200 may be embodied as hardware, firmware, software, or a combination thereof. As such, in some embodiments, one or more of the components of the environment 200 may be embodied as circuitry or collection of electrical devices (e.g., firmware environment circuitry 202, USB controller circuitry 208, and/or runtime environment circuitry 212). It should be appreciated that, in such embodiments, one or more of the firmware environment circuitry 202, the USB controller circuitry 208, and/or the runtime environment circuitry 212 may form a portion of the processor 120, the I/O subsystem 128, an I/O controller 138, and/or other components of the computing device 100. Additionally, in some embodiments, one or more of the illustrative components may form a portion of another component and/or one or more of the illustrative components may be independent of one another.

The firmware environment 202 may be embodied as a pre-boot platform firmware environment of the computing device 100, such as a UEFI firmware environment, BIOS firmware environment, or other firmware environment. The firmware environment 202 is configured to load a firmware enclave 204 with the secure enclave support 122 of the processor 120 in response to booting the computing device 100. The firmware enclave 204 may be embodied as a trusted execution environment or other trusted software of the computing device 100, such as a secure enclave established with Intel SGX. The firmware enclave 204 executes in the pre-boot firmware environment 202.

The runtime environment 212 may be embodied as an operating system, virtual machine monitor, hypervisor, or other runtime environment executed by the computing device 100 after exiting the pre-boot firmware environment 202. The runtime environment 212 is configured to load a policy enforcement enclave 214 with the secure enclave support 122 of the processor 120. Similar to the firmware enclave 204, the policy enforcement enclave 214 may be embodied as a trusted execution environment or other trusted software of the computing device 100, such as a secure enclave established with Intel SGX. The policy enforcement enclave 214 executes in the runtime environment 212.

The firmware enclave 204 is configured to randomly generate a binding identity 210 after being loaded, and to securely provision the binding identity 210 to the USB controller 208. The binding identity 210 may be embodied as any unique identifier or other value that is initially private to the firmware enclave 204. The firmware enclave 204 may securely provision the binding identity to the USB controller 208 by sending the binding identity to a static configuration device 206 via a secure I/O channel. In some embodiments, the firmware enclave 204 may securely provision the binding identity 210 by executing an EBIND instruction to bind the binding identity to the USB controller 208 and executing (or requesting privileged software to execute) an UNWRAP instruction to unwrap the binding identity 210 and deliver the binding identity 210 to the USB controller 208 via a secure fabric of the computing device 100. The firmware enclave 204 is further configured to seal the binding identity 210 to generate a sealed binding identity 216, which is encrypted. The binding identity 210 may be sealed with a signing identity of the firmware enclave 204, which may be the identity of an authority of the firmware enclave 204 (e.g., a manufacturer, operating system vendor, system administrator, or other authority).

The policy enforcement enclave 214 is configured to unseal the sealed binding identity 216 to recover the binding identity 210 after being loaded. The sealed binding identity 216 may be unsealed with the signing identity of the policy enforcement enclave 214, which is the same as the signing identity of the firmware enclave 204. The policy enforcement enclave 214 is further configured to send a policy enforcement command 218 to the USB controller 208. The policy enforcement command 218 includes the binding identity 210. The policy enforcement command 218 may, for example, request that data transfers be blocked for one or more identified USB devices, request that device configuration change commands be blocked for one or more identified USB devices, or request other policy actions. In some embodiments, the policy enforcement command 218 may be sent to the static USB configuration device 206.

The USB controller 208 is configured to determine whether the binding identity 210 included in the policy enforcement command 218 matches the binding identity 210 that was previously securely provisioned to the USB controller 208. If the binding identities 210 match, the USB controller 208 is further configured to enforce the policy enforcement command 218, for example by blocking data transfers and/or device configuration change commands associated with one or more identified USB devices. If the binding identities 210 do not match, the USB controller 208 is further configured to indicate a verification error, for example, by setting a binding failure bit of the USB controller 208.

The static USB configuration device 206 may be embodied as a USB device 140 that is statically connected to the USB controller 208. In some embodiments, the static USB configuration device 206 may be included in or otherwise incorporated in the USB controller 208. In some embodiments, trusted software such as the firmware enclave 204 and/or the policy enforcement enclave 214 may establish a trusted I/O (TIO) secure channel to the static USB configuration device 206 in order to securely send commands or other data to the USB controller 208.

Figure 3:
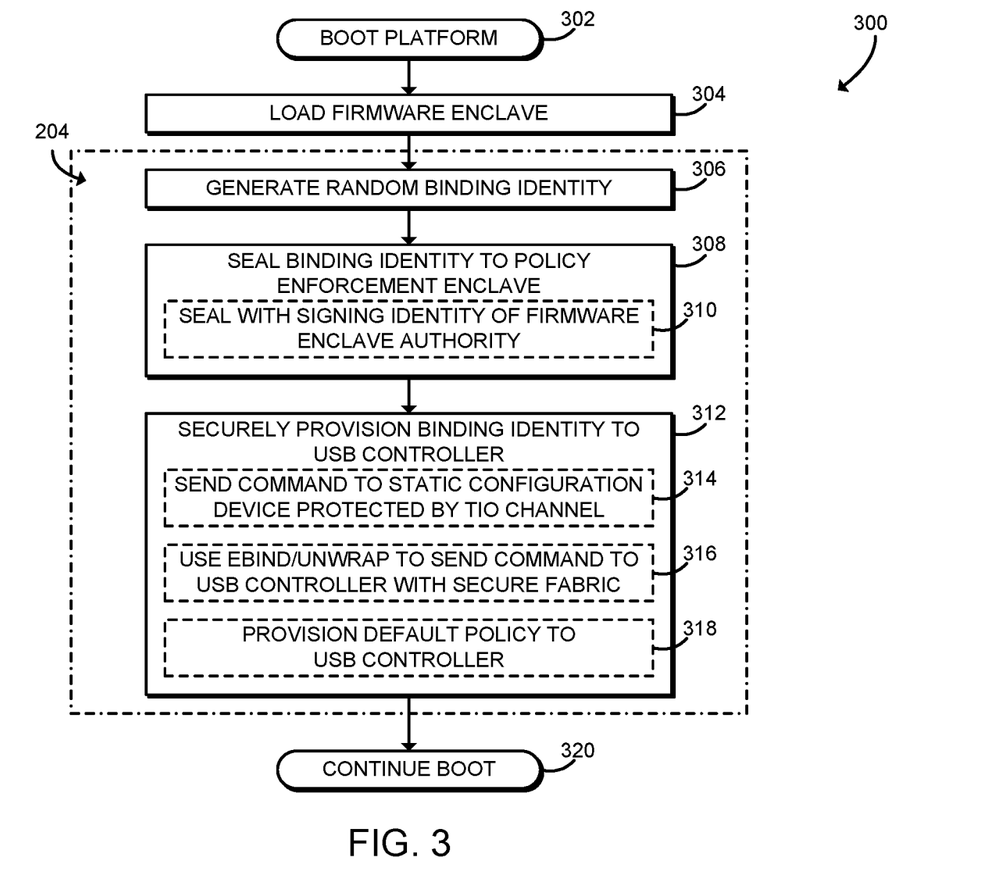
FIG. 3 is a simplified flow diagram of at least one embodiment of a method for securely provisioning a binding identity that may be executed by the computing device of FIGS. 1-2.

Referring now to FIG. 3, in use, the computing device 100 may execute a method 300 for securely provisioning a binding identity 210. It should be appreciated that, in some embodiments, the operations of the method 300 may be performed by one or more components of the environment 200 of the computing device 100 as shown in FIG. 2, such as the firmware environment 202. The method 300 begins in block 302, in which the computing device 100 boots. The computing device 100 may start the boot process, for example, in response to a reboot, power cycle, or other reset of the computing device 100. In response to booting, the computing device 100 loads the firmware environment 202. The firmware environment 202 may configure hardware, initialize firmware execution environments (e.g., pre-UEFI environments, UEFI driver execution environments, or other firmware environments), and perform other initialization tasks.

In block 304, the firmware environment 202 loads the firmware enclave 204 using the secure enclave support 122 of the processor 120. Loading the firmware enclave 204 may verify, authenticate, or otherwise ensure that the firmware enclave 204 was provided by an identified authority and has not been tampered with. For example, the processor 120 may measure the code and/or data of the firmware enclave 204 as it is loaded into the memory 130 and verify that measurement. Additionally, the firmware enclave 204 may be cryptographically signed by an authority that provided the firmware enclave 204, such as a device manufacturer, operating system vendor, system administrator, or other authority. After being successfully loaded and verified, the firmware enclave 204 may be trusted by the computing device 100. As shown in FIG. 3, execution of the method 300 proceeds to enter the firmware enclave 204.

In block 306, the firmware enclave 204 generates a random binding identity 210. The binding identity 210 may be embodied as any unique identifier or other value. A new binding identity 210 is generated on each boot, and the binding identity 210 is initially private to the firmware enclave 204. That is, the binding identity 210 is a secret of the firmware enclave 204 and is not initially available to other software and/or hardware components of the computing device 100.

In block 308, the firmware enclave 204 seals the binding identity 210 to the policy enforcement enclave 214. Sealing the binding identity 210 encrypts the binding identity 210 to generate the sealed binding identity 216 and stores the sealed binding identity 216 in a location accessible by the policy enforcement enclave 214 (e.g., the data storage device 132). The sealed binding identity 216 is encrypted with an encryption key that is accessible to the policy enforcement enclave 214. In some embodiments, in block 310 the binding identity 210 may be sealed using the signing identity of an authority of the firmware enclave 204. The authority may be, for example, a device manufacturer, operating system vendor, administrator, or other authority associated with the firmware enclave 204. For example, a hash of the public key of the authority for the firmware enclave 204 may be stored in the MRSIGNER register, and the processor 120 may generate the encryption key as a function of the MRSIGNER register. As described further below, the policy enforcement enclave 214 may be associated with the same authority, and thus may use the same MRSIGNER value to unseal the sealed binding identity 216.

In block 312, the firmware enclave 204 securely provisions the binding identity 210 to the USB controller 208. The firmware enclave 204 may use any technique that is protected from untrusted software, hardware, or other components of the computing device 100 to send the binding identity 210 to the USB controller 208. In some embodiments, in block 314 the firmware enclave 204 may send the secure command to the static USB configuration device 206 over a secure channel that is protected by trusted I/O. For example, the static USB configuration device 206 may be assigned a static channel identifier (CID), and the command may be sent as I/O data protected by that CID. The CE 124, the CID filter 136, and/or secure routing support of the I/O subsystem 128 may ensure that the contents of the binding identity 210 are not accessible by untrusted software or by other I/O controllers 138 of the computing device 100.

In some embodiments, in block 316, the firmware enclave 204 may use the EBIND and UNWRAP processor instructions to send the binding identity 210 to the USB controller 208 securely over a secure fabric of the computing device 100. For example, executing the EBIND instruction may encrypt (bind) the binding identity 210 with an encryption key that is private to the processor 120, which protects the contents of the binding identity 210 from untrusted software and hardware components. The UNWRAP instruction (which may be executed by privileged software of the computing device 100) causes microcode of the processor 120 to decrypt the binding identity 210 and deliver the decrypted binding identity 210 to the USB controller 208 over a secure fabric such as a sideband network. The sideband network may be embodied as, for example, a fabric, mesh, ring, or other collection of electrical connections that supports secure routing to components of the computing device 100 but does not support routing beyond the computing device 100 (i.e., over a network interface).

In some embodiments, in block 318, the firmware enclave 204 may provision a default policy to the USB controller 208. For example, a default policy might be to block all devices until the policy enforcement enclave 214 programs a policy that allows certain types of devices. As another example, the default policy may only allow certain types of devices required during boot (such as a keyboard). Because the policy enforcement enclave 214 depends on the operating system to program the USB controller 208 (e.g., by executing the UNWRAP instruction), provisioning a default policy may allow devices to be blocked, even in the presence of an untrusted operating system that prevents the policy enforcement enclave 214 from further programming the USB controller 208.

After sealing the binding identity 210 to the policy enforcement enclave 214 and provisioning the binding identity 210 to the USB controller 208, the firmware enclave 204 may exit. The method 300 proceeds to block 320, in which the computing device 100 continues the boot process. The computing device 100 may, for example, execute one or more boot targets that exit boot services and launch the runtime environment 212, for example, by executing an operating system. After proceeding with the boot process, the method 300 is completed. The method 300 may be executed in response to a subsequent platform reset or other platform boot events.

Figure 4:
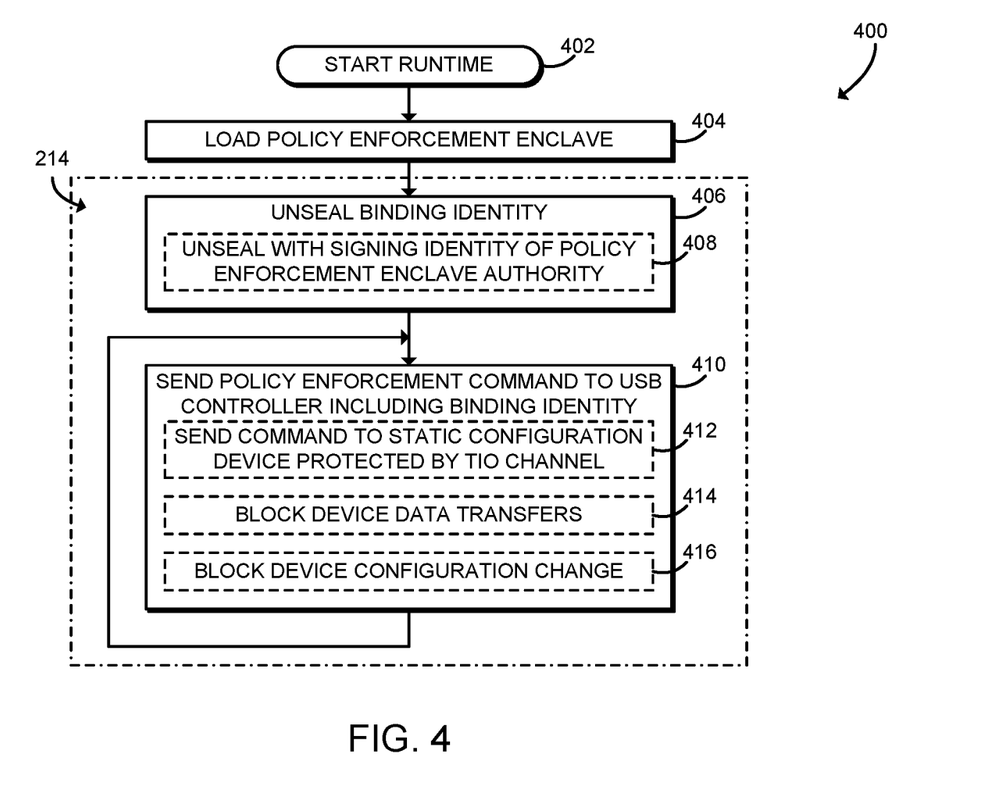
FIG. 4 is a simplified flow diagram of at least one embodiment of a method for USB device policy enforcement that may be executed by the computing device of FIGS. 1-2.

Referring now to FIG. 4, in use, the computing device 100 may execute a method 400 for USB device policy enforcement. It should be appreciated that, in some embodiments, the operations of the method 400 may be performed by one or more components of the environment 200 of the computing device 100 as shown in FIG. 2, such as the runtime environment 212. The method 400 begins in block 402, in which the computing device 100 starts the runtime environment 212. As described above in connection with FIG. 3, the runtime environment 212 may be launched or otherwise executed by the firmware environment 202, for example by executing an exit boot services function.

In block 404, the runtime environment 212 loads the policy enforcement enclave 214 using the secure enclave support 122 of the processor 120. Loading the policy enforcement enclave 214 may verify, authenticate, or otherwise ensure that the policy enforcement enclave 214 was provided by an identified authority and has not been tampered with. For example, the processor 120 may measure the code and/or data of the policy enforcement enclave 214 as it is loaded into the memory 130 and verify that measurement. Additionally, the policy enforcement enclave 214 may be cryptographically signed by an authority that provided the policy enforcement enclave 214, such as a device manufacturer, operating system vendor, system administrator, or other authority. After being successfully loaded and verified, the policy enforcement enclave 214 may be trusted by the computing device 100. As shown in FIG. 4, execution of the method 400 proceeds to enter the policy enforcement enclave 214.

In block 406, the policy enforcement enclave 214 unseals the sealed binding identity 216 to recover the binding identity 210. As described above in connection with FIG. 3, the sealed binding identity 216 is stored by the firmware enclave 204 in a location accessible by the policy enforcement enclave 214 (e.g., the data storage device 132). Unsealing the sealed binding identity 216 decrypts the sealed binding identity 216 to recover the original binding identity 210. The sealed binding identity 216 is decrypted using an encryption key that is accessible by the policy enforcement enclave 214. In some embodiments, in block 408 the sealed binding identity 216 may be unsealed using the signing identity of an authority of the policy enforcement enclave 214. The authority may be, for example, a device manufacturer, operating system vendor, administrator, or other authority associated with the policy enforcement enclave 214. For example, a hash of the public key of the authority for the policy enforcement enclave 214 may be stored in the MRSIGNER register, and the processor 120 may generate the decryption key as a function of the MRSIGNER register. If the firmware enclave 204 and the policy enforcement enclave 214 are both signed by the same authority, then the MRSIGNER register values match, and the policy enforcement enclave 214 may successfully unseal the sealed binding identity 216.

In block 410, the policy enforcement enclave 214 sends a policy enforcement command 218 to the USB controller 208. The policy enforcement command 218 includes the binding identity 210. The policy enforcement command 218 may be sent to the USB controller 208 using a secure communication technique. In some embodiments, in block 412 the policy enforcement enclave 214 may send the policy enforcement command 218 to the static USB configuration device 206 over a secure channel that is protected by trusted I/O. For example, the static USB configuration device 206 may be assigned a static channel identifier (CID), and the command may be sent as I/O data protected by that CID. The CE 124, the CID filter 136, and/or secure routing support of the I/O subsystem 128 may ensure that the contents of the policy enforcement command 218 are not accessible by untrusted software or by other I/O controllers 138 of the computing device 100.

The policy enforcement command 218 may include any command to restrict usage of a USB device. The policy enforcement command 218 may be determined based on an enterprise policy or otherwise configured by an administrator of the computing device 100. In some embodiments, in block 414, the policy enforcement command 218 may block all data transfers associated with one or more USB devices. For example, a potentially malicious device, such as a flash storage device that fails USB authentication, may be blocked. As another example, enterprise policy may block a particular device or type of devices, such as a flash storage device, from being used by software. As described further below, in some embodiments, data transfers for all newly connected USB devices may be blocked by default. In those embodiments, the policy enforcement command 218 may allow data transfers for one or more devices. To identify the device(s) to be blocked, the policy enforcement command 218 may include a bitmap that identifies device slots to be blocked. The USB controller 208 may support a maximum number of device slots (e.g., 64 device slots). Each device slot represents a port, index, or other location at which a USB device 140 may attach to the USB controller 208. Thus, in the illustrative example, the policy enforcement command 218 may include a 64-bit bitmap, and for each bit set in the bitmap, the USB controller 208 may block data transfers for the USB device associated with the corresponding device slot.

In some embodiments, the policy enforcement command 218 may block device configuration changes for one or more USB devices. Device configuration changes may be blocked after a configuration has been set and data transfer is taking place. Configuration changes may USB devices may have multiple configurations, such as different speeds that may affect bus bandwidth consumption. Trusted software may use such policies to allow for only known, trusted, or otherwise set configurations. The policy enforcement command 218 may identify one or more device slots to block as well as one or more types of control transfers to block.

After sending the policy enforcement command 218, the method 400 loops back to block 410 to continue sending policy enforcement commands 218 to the USB controller 208. The method 400 may continue until a platform reset or other reboot event.

Figure 5:
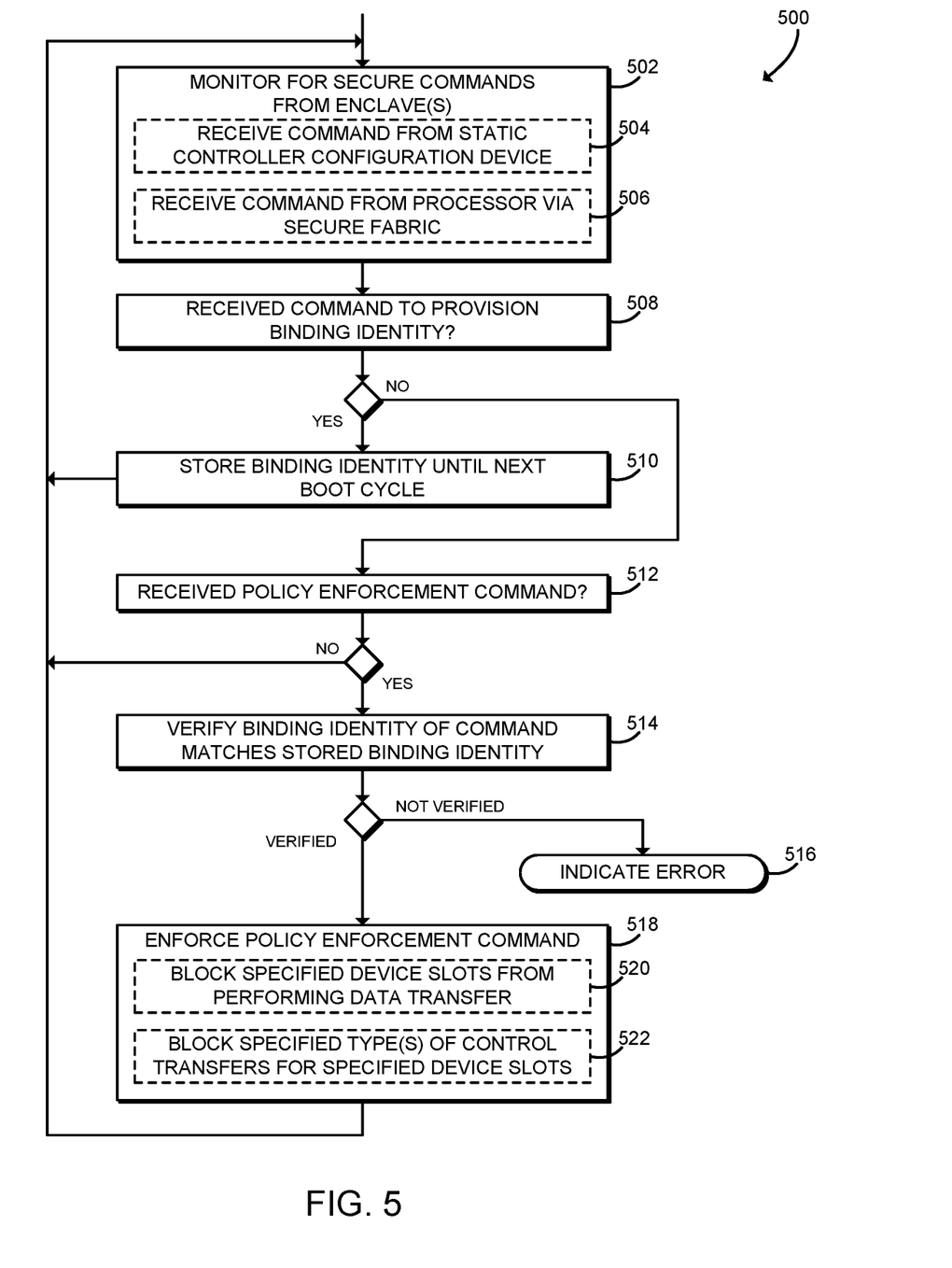
FIG. 5 is a simplified flow diagram of at least one embodiment of a method for USB device policy command authentication and enforcement that may be executed by the computing device of FIGS. 1-2.

Referring now to FIG. 5, in use, the computing device 100 may execute a method 500 for USB device policy command authentication and enforcement. It should be appreciated that, in some embodiments, the operations of the method 500 may, be performed by one or more components of the environment 200 of the computing device 100 as shown in FIG. 2, such as the USB controller 208. The method 500 begins in block 502, in which the USB controller 208 monitors for secure commands received from the firmware enclave 204 and/or the policy enforcement enclave 214. As described above, the enclaves 204, 214 may use any technique to send secure commands to the USB controller 208 that is protected from untrusted software and/or hardware of the computing device 100. In some embodiments, in block 504 the USB controller 208 may receive secure commands sent to the static USB configuration device 206. As described above, those commands may be sent over a secure channel that is protected by trusted I/O. In some embodiments, in block 506, the USB controller 208 may receive commands from the processor 120 over a secure fabric such as the sideband network of the computing device 100. For example, as described above, in response to an UNWRAP instruction the processor 120 may decrypt a command and deliver the decrypted command to the USB controller 208 over the secure fabric.

In block 508, the USB controller 208 determines whether a command to provision a binding identity 210 has been received from the firmware enclave 204. If not, the method 500 branches ahead to block 512, described below. If a command to provision the binding identity 210 is received, the method 500 advances to block 510. In block 510, the USB controller 208 stores the binding identity 210 until the next platform boot cycle (e.g., platform reset, power cycle, or other boot event). The binding identity 210 may be stored in any volatile or nonvolatile storage of the USB controller 208 that is not accessible to untrusted software and/or hardware of the computing device 100. After storing the binding identity 210, the method 500 loops back to block 502 to continue monitoring for secure commands.

In block 512, the USB controller 208 determines whether a policy enforcement command 218 has been received from the policy enforcement enclave 214. If not, the method 500 loops back to block 502 to continue monitoring for secure commands. If a policy enforcement command 218 has been received, the method 500 advances to block 514.

In block 514, the USB controller 208 verifies that a binding identity 210 included in the policy enforcement command 218 matches the binding identity 210 that was previously stored as described in connection with block 510. If the binding identities 210 match, this indicates that the policy enforcement enclave 214 was provided by the same authority as the firmware enclave 204 and is thus trusted by the computing device 100. If the binding identities 210 are not successfully verified, the method 500 branches to block 516, in which the USB controller 208 indicates a binding error. For example, the USB controller 208 may set a binding failure bit, flag, or register to indicate the error. After indicating the error, the method 500 may be completed. If an error is indicated, the USB controller 208 does not enforce the policy enforcement command 218.

Referring back to block 514, if the binding identities 210 are successfully verified, the method 500 advances to block 518. In block 518, the USB controller 208 enforces the policy enforcement command 218. The USB controller 208 may perform any operation specified by the policy enforcement command 218 to restrict device usage. In some embodiments, in block 520, the USB controller 208 may block data transfers to or from USB devices associated with one or more specified device slots. For example, the USB controller 208 may modify an internal state machine to prevent the specified slots from entering a configured state. To block the specified slots, the USB controller 208 may copy a bitmap from the policy enforcement command 218 to a blocked slots map register of the USB controller 208. Each bit of the blocked slots map register may indicate whether the corresponding device slot is blocked. In some embodiments, the USB controller 208 may block data transfers for any slots associated with a newly connected USB device. The USB controller 208 may include an auto-block bit that may be set by the firmware enclave 204 to enable that auto-block behavior.

In some embodiments, in block 522 the USB controller 208 may block one or more specified types of control transfers for one or more specified device slots. As described above, the policy enforcement command 218 may specify to block configuration changes for a USB device after a configuration has been set and data transfer is taking place. The USB controller 208 may block control transfers by monitoring an internal control transfer ring for each slot. The USB controller 208 may examine the type of each control transfer in the ring and may prevent matching control transfer requests from being issued to the corresponding USB device. After enforcing the policy enforcement command 218, the method 500 loops back to block 502 to continue monitoring for secure commands.

It should be appreciated that, in some embodiments, the methods 300, 400, and/or 500 may be embodied as various instructions stored on a computer-readable media, which may be executed by the processor 120, the I/O subsystem 128, the USB controller 208, and/or other components of the computing device 100 to cause the computing device 100 to perform the respective method 300, 400, and/or 500. The computer-readable media may be embodied as any type of media capable of being read by the computing device 100 including, but not limited to, the memory 130, the data storage device 132, firmware devices, other memory or data storage devices of the computing device 100, portable media readable by a peripheral device 140 of the computing device 100, and/or other media.

EXAMPLES

Illustrative examples of the technologies disclosed herein are provided below. An embodiment of the technologies may include any one or more, and any combination of, the examples described below.

Example 1 includes a computing device for device policy enforcement, the computing device comprising: a USB controller; a firmware enclave to (i) randomly generate a binding identity, (ii) securely provision the binding identity to the USB controller, and (iii) seal the binding identity to generate an encrypted binding identity, wherein the firmware enclave comprises a trusted execution environment; and a policy enforcement enclave to (i) unseal the encrypted binding identity to recover the binding identity and (ii) send a policy enforcement command to the USB controller, wherein the policy enforcement command comprises the binding identity, and wherein the policy enforcement enclave comprises a trusted execution environment; wherein the USB controller is to determine whether the binding identity of the policy enforcement command matches the securely provisioned binding identity.

Example 2 includes the subject matter of Example 1, and wherein the USB controller is further to enforce the policy enforcement command in response to a determination that the binding identity of the policy enforcement command matches the securely provisioned binding identity.

Example 3 includes the subject matter of any of Examples 1 and 2, and wherein to enforce the policy enforcement command comprises to block data transfers associated with a USB device coupled to the USB controller.

Example 4 includes the subject matter of any of Examples 1-3, and wherein to block the data transfers comprises to prevent a device slot associated with the USB device from entering a configured state.

Example 5 includes the subject matter of any of Examples 1-4, and wherein to send the policy enforcement command comprises to send a block data transfer command, wherein the block data transfer command identifies the USB device.

Example 6 includes the subject matter of any of Examples 1-5, and wherein to enforce the policy enforcement command comprises to block configuration changes associated with a USB device coupled to the USB controller.

Example 7 includes the subject matter of any of Examples 1-6, and wherein to block the configuration changes comprises to monitor an internal control transfer ring of the USB controller to identify configuration change requests for the USB device.

Example 8 includes the subject matter of any of Examples 1-7, and wherein to send the policy enforcement command comprises to send a block device configuration change command, wherein the block device configuration change command identifies the USB device.

Example 9 includes the subject matter of any of Examples 1-8, and further comprising: a processor that includes secure enclave support; and a firmware environment to load the firmware enclave with the secure enclave support of the processor in response to a boot of the computing device; wherein to randomly generate the binding identity comprises to randomly generate the binding identity in response to a load of the firmware enclave.

Example 10 includes the subject matter of any of Examples 1-9, and further comprising: a runtime environment to load the policy enforcement enclave with the secure enclave support; wherein to unseal the encrypted binding identity comprises to unseal the encrypted binding identity in response to a load of the policy enforcement enclave.

Example 11 includes the subject matter of any of Examples 1-10, and wherein the USB controller is further to indicate a verification error in response to a determination that the binding identity of the policy enforcement command does not match the securely provisioned binding identity.

Example 12 includes the subject matter of any of Examples 1-11, and wherein to indicate the verification error comprises to set a binding failure bit of the USB controller.

Example 13 includes the subject matter of any of Examples 1-12, and wherein: to seal the binding identity comprises to seal the binding identity with a first signing identity of the firmware enclave; and to unseal the encrypted binding identity comprises to unseal the encrypted binding identity with a second signing identity of the policy enforcement enclave, wherein the first signing identity matches the second signing identity.

Example 14 includes the subject matter of any of Examples 1-13, and wherein the first signing identity and the second signing identity comprise an identity of an authority of the firmware enclave and the policy enforcement enclave.

Example 15 includes the subject matter of any of Examples 1-14, and wherein: to seal the binding identity with the first signing identity comprises to generate a first private key as a function of the first signing identity; and to unseal the encrypted binding identity with the second signing identity comprises to generate the first private key as a function of the second signing identity.

Example 16 includes the subject matter of any of Examples 1-15, and wherein to securely provision the binding identity to the USB controller comprises to send the binding identity to a static configuration device via a secure I/O channel, wherein the static configuration device is statically coupled to the USB controller.

Example 17 includes the subject matter of any of Examples 1-16, and wherein to send the policy enforcement command to the USB controller comprises to send the policy enforcement command to the static configuration device.

Example 18 includes the subject matter of any of Examples 1-17, and wherein to securely provision the binding identity to the USB controller comprises to: execute a first processor instruction to bind the binding identity to the USB controller; and execute a second processor instruction to unwrap the binding identity and deliver the binding identity to the USB controller via a secure fabric of the computing device.

Example 19 includes a method for device policy enforcement, the method comprising: randomly generating, by a firmware enclave of a computing device, a binding identity, wherein the firmware enclave comprises a trusted execution environment; securely provisioning, by the firmware enclave, the binding identity to a USB controller of the computing device; sealing, by the firmware enclave, the binding identity to generate an encrypted binding identity; unsealing, by a policy enforcement enclave, the encrypted binding identity to recover the binding identity, wherein the policy enforcement enclave comprises a trusted execution environment; sending, by the policy enforcement enclave, a policy enforcement command to the USB controller, wherein the policy enforcement command comprises the binding identity; and determining, by the USB controller, whether the binding identity of the policy enforcement command matches the securely provisioned binding identity.

Example 20 includes the subject matter of Example 19, and further comprising enforcing, by the USB controller, the policy enforcement command in response to determining that the binding identity of the policy enforcement command matches the securely provisioned binding identity.

Example 21 includes the subject matter of any of Examples 19 and 20, and wherein enforcing the policy enforcement command comprises blocking data transfers associated with a USB device coupled to the USB controller.

Example 22 includes the subject matter of any of Examples 19-21, and wherein blocking the data transfers comprises preventing a device slot associated with the USB device from entering a configured state.

Example 23 includes the subject matter of any of Examples 19-22, and wherein sending the policy enforcement command comprises sending a block data transfer command, wherein the block data transfer command identifies the USB device.

Example 24 includes the subject matter of any of Examples 19-23, and wherein enforcing the policy enforcement command comprises blocking configuration changes associated with a USB device coupled to the USB controller.

Example 25 includes the subject matter of any of Examples 19-24, and wherein blocking the configuration changes comprises monitoring an internal control transfer ring of the USB controller to identify configuration change requests for the USB device.

Example 26 includes the subject matter of any of Examples 19-25, and wherein sending the policy enforcement command comprises sending a block device configuration change command, wherein the block device configuration change command identifies the USB device.

Example 27 includes the subject matter of any of Examples 19-26, and further comprising: loading, by a firmware environment of the computing device, the firmware enclave using secure enclave support of a processor of the computing device in response to a boot of the computing device; wherein randomly generating the binding identity comprises randomly generating the binding identity in response to loading the firmware enclave.

Example 28 includes the subject matter of any of Examples 19-27, and further comprising: loading, by a runtime environment of the computing device, the policy enforcement enclave using the secure enclave support; wherein unsealing the encrypted binding identity comprises unsealing the encrypted binding identity in response to loading the policy enforcement enclave.

Example 29 includes the subject matter of any of Examples 19-28, and further comprising indicating, by the USB controller, a verification error in response to determining that the binding identity of the policy enforcement command does not match the securely provisioned binding identity.

Example 30 includes the subject matter of any of Examples 19-29, and wherein indicating the verification error comprises setting a binding failure bit of the USB controller.

Example 31 includes the subject matter of any of Examples 19-30, and wherein: sealing the binding identity comprises sealing the binding identity with a first signing identity of the firmware enclave; and unsealing the encrypted binding identity comprises unsealing the encrypted binding identity with a second signing identity of the policy enforcement enclave, wherein the first signing identity matches the second signing identity.

Example 32 includes the subject matter of any of Examples 19-31, and wherein the first signing identity and the second signing identity comprise an identity of an authority of the firmware enclave and the policy enforcement enclave.

Example 33 includes the subject matter of any of Examples 19-32, and wherein: sealing the binding identity with the first signing identity comprises generating a first private key as a function of the first signing identity; and unsealing the encrypted binding identity with the second signing identity comprises generating the first private key as a function of the second signing identity.

Example 34 includes the subject matter of any of Examples 19-33, and wherein securely provisioning the binding identity to the USB controller comprises sending the binding identity to a static configuration device via a secure I/O channel, wherein the static configuration device is statically coupled to the USB controller.

Example 35 includes the subject matter of any of Examples 19-34, and wherein sending the policy enforcement command to the USB controller comprises sending the policy enforcement command to the static configuration device.

Example 36 includes the subject matter of any of Examples 19-35, and wherein securely provisioning the binding identity to the USB controller comprises: executing a first processor instruction to bind the binding identity to the USB controller; and executing a second processor instruction to unwrap the binding identity and deliver the binding identity to the USB controller via a secure fabric of the computing device.

Example 37 includes a computing device comprising: a processor; and a memory having stored therein a plurality of instructions that when executed by the processor cause the computing device to perform the method of any of Examples 19-36.

Example 38 includes one or more non-transitory, computer readable storage media comprising a plurality of instructions stored thereon that in response to being executed result in a computing device performing the method of any of Examples 19-36.

Example 39 includes a computing device comprising means for performing the method of any of Examples 19-36.

Example 40 includes a computing device for device policy enforcement, the computing device comprising: means for randomly generating, by a firmware enclave of the computing device, a binding identity, wherein the firmware enclave comprises a trusted execution environment; means for securely provisioning, by the firmware enclave, the binding identity to a USB controller of the computing device; means for sealing, by the firmware enclave, the binding identity to generate an encrypted binding identity; means for unsealing, by a policy enforcement enclave, the encrypted binding identity to recover the binding identity, wherein the policy enforcement enclave comprises a trusted execution environment; means for sending, by the policy enforcement enclave, a policy enforcement command to the USB controller, wherein the policy enforcement command comprises the binding identity; and means for determining, by the USB controller, whether the binding identity of the policy enforcement command matches the securely provisioned binding identity.

Example 41 includes the subject matter of Example 40, and further comprising means for enforcing, by the USB controller, the policy enforcement command in response to determining that the binding identity of the policy enforcement command matches the securely provisioned binding identity.

Example 42 includes the subject matter of any of Examples 40 and 41, and wherein the means for enforcing the policy enforcement command comprises means for blocking data transfers associated with a USB device coupled to the USB controller.

Example 43 includes the subject matter of any of Examples 40-42, and wherein the means for blocking the data transfers comprises means for preventing a device slot associated with the USB device from entering a configured state.

Example 44 includes the subject matter of any of Examples 40-43, and wherein the means for sending the policy enforcement command comprises means for sending a block data transfer command, wherein the block data transfer command identifies the USB device.

Example 45 includes the subject matter of any of Examples 40-44, and wherein the means for enforcing the policy enforcement command comprises means for blocking configuration changes associated with a USB device coupled to the USB controller.

Example 46 includes the subject matter of any of Examples 40-45, and wherein the means for blocking the configuration changes comprises means for monitoring an internal control transfer ring of the USB controller to identify configuration change requests for the USB device.

Example 47 includes the subject matter of any of Examples 40-46, and wherein the means for sending the policy enforcement command comprises means for sending a block device configuration change command, wherein the block device configuration change command identifies the USB device.

Example 48 includes the subject matter of any of Examples 40-47, and further comprising: means for loading, by a firmware environment of the computing device, the firmware enclave using secure enclave support of a processor of the computing device in response to a boot of the computing device; wherein the means for randomly generating the binding identity comprises means for randomly generating the binding identity in response to loading the firmware enclave.

Example 49 includes the subject matter of any of Examples 40-48, and further comprising: means for loading, by a runtime environment of the computing device, the policy enforcement enclave using the secure enclave support; wherein the means for unsealing the encrypted binding identity comprises means for unsealing the encrypted binding identity in response to loading the policy enforcement enclave.

Example 50 includes the subject matter of any of Examples 40-49, and further comprising means for indicating, by the USB controller, a verification error in response to determining that the binding identity of the policy enforcement command does not match the securely provisioned binding identity.

Example 51 includes the subject matter of any of Examples 40-50, and wherein the means for indicating the verification error comprises means for setting a binding failure bit of the USB controller.

Example 52 includes the subject matter of any of Examples 40-51, and wherein: the means for sealing the binding identity comprises means for sealing the binding identity with a first signing identity of the firmware enclave; and the means for unsealing the encrypted binding identity comprises means for unsealing the encrypted binding identity with a second signing identity of the policy enforcement enclave, wherein the first signing identity matches the second signing identity.

Example 53 includes the subject matter of any of Examples 40-52, and wherein the first signing identity and the second signing identity comprise an identity of an authority of the firmware enclave and the policy enforcement enclave.

Example 54 includes the subject matter of any of Examples 40-53, and wherein: the means for sealing the binding identity with the first signing identity comprises means for generating a first private key as a function of the first signing identity; and the means for unsealing the encrypted binding identity with the second signing identity comprises means for generating the first private key as a function of the second signing identity.

Example 55 includes the subject matter of any of Examples 40-54, and wherein the means for securely provisioning the binding identity to the USB controller comprises means for sending the binding identity to a static configuration device via a secure I/O channel, wherein the static configuration device is statically coupled to the USB controller.

Example 56 includes the subject matter of any of Examples 40-55, and wherein the means for sending the policy enforcement command to the USB controller comprises means for sending the policy enforcement command to the static configuration device.

Example 57 includes the subject matter of any of Examples 40-56, and wherein the means for securely provisioning the binding identity to the USB controller comprises: means for executing a first processor instruction to bind the binding identity to the USB controller; and means for executing a second processor instruction to unwrap the binding identity and deliver the binding identity to the USB controller via a secure fabric of the computing device.

The invention claimed is:

1. A computing device for device policy enforcement, the computing device comprising:
   a USB controller;
   a firmware enclave to (i) randomly generate a binding identity, (ii) securely provision the binding identity to the USB controller, and (iii) seal the binding identity to generate an encrypted binding identity, wherein the firmware enclave comprises a trusted execution environment; and
   a policy enforcement enclave to (i) unseal the encrypted binding identity to recover the binding identity and (ii) send a policy enforcement command to the USB controller, wherein the policy enforcement command comprises the binding identity, and wherein the policy enforcement enclave comprises a trusted execution environment;
   wherein the USB controller is to (i) determine whether the binding identity of the policy enforcement command matches the securely provisioned binding identity and (ii) enforce the policy enforcement command in response to a determination that the binding identity of the policy enforcement command matches the securely provisioned binding identity;
   wherein to enforce the policy enforcement command comprises to block configuration changes associated with a USB device coupled to the USB controller, and wherein to block the configuration changes comprises to monitor an internal control transfer ring of the USB controller to identify configuration change requests for the USB device.

2. The computing device of claim 1, wherein to enforce the policy enforcement command further comprises to block data transfers associated with a USB device coupled to the USB controller.

3. The computing device of claim 2, wherein to block the data transfers comprises to prevent a device slot associated with the USB device from entering a configured state.

4. The computing device of claim 1, further comprising:
   a processor that includes secure enclave support; and
   a firmware environment to load the firmware enclave with the secure enclave support of the processor in response to a boot of the computing device;
   wherein to randomly generate the binding identity comprises to randomly generate the binding identity in response to a load of the firmware enclave.

5. The computing device of claim 4, further comprising:
   a runtime environment to load the policy enforcement enclave with the secure enclave support;
   wherein to unseal the encrypted binding identity comprises to unseal the encrypted binding identity in response to a load of the policy enforcement enclave.

6. The computing device of claim 1, wherein the USB controller is further to indicate a verification error in response to a determination that the binding identity of the policy enforcement command does not match the securely provisioned binding identity.

7. The computing device of claim 1, wherein:
   to seal the binding identity comprises to seal the binding identity with a first signing identity of the firmware enclave; and to unseal the encrypted binding identity comprises to unseal the encrypted binding identity with a second signing identity of the policy enforcement enclave, wherein the first signing identity matches the second signing identity.

8. The computing device of claim 7, wherein the first signing identity and the second signing identity comprise an identity of an authority of the firmware enclave and the policy enforcement enclave.

9. The computing device of claim 1, wherein to securely provision the binding identity to the USB controller comprises to send the binding identity to a static configuration device via a secure I/O channel, wherein the static configuration device is statically coupled to the USB controller.

10. The computing device of claim 1, wherein to securely provision the binding identity to the USB controller comprises to:
execute a first processor instruction to bind the binding identity to the USB controller; and
execute a second processor instruction to unwrap the binding identity and deliver the binding identity to the USB controller via a secure fabric of the computing device.

11. A method for device policy enforcement, the method comprising:
randomly generating, by a firmware enclave of a computing device, a binding identity, wherein the firmware enclave comprises a trusted execution environment;
securely provisioning, by the firmware enclave, the binding identity to a USB controller of the computing device;
sealing, by the firmware enclave, the binding identity to generate an encrypted binding identity;
unsealing, by a policy enforcement enclave, the encrypted binding identity to recover the binding identity, wherein the policy enforcement enclave comprises a trusted execution environment;
sending, by the policy enforcement enclave, a policy enforcement command to the USB controller, wherein the policy enforcement command comprises the binding identity;
determining, by the USB controller, whether the binding identity of the policy enforcement command matches the securely provisioned binding identity; and
enforcing, by the USB controller, the policy enforcement command in response to determining that the binding identity of the policy enforcement command matches the securely provisioned binding identity;
wherein enforcing the policy enforcement command comprises blocking configuration changes associated with a USB device coupled to the USB controller, and wherein blocking the configuration changes comprises monitoring an internal control transfer ring of the USB controller to identify configuration change requests for the USB device.

12. The method of claim 11, wherein enforcing the policy enforcement command further comprises blocking data transfers associated with a USB device coupled to the USB controller.

13. The method of claim 11, further comprising:
loading, by a firmware environment of the computing device, the firmware enclave using secure enclave support of a processor of the computing device in response to a boot of the computing device;
wherein randomly generating the binding identity comprises randomly generating the binding identity in response to loading the firmware enclave.

14. The method of claim 13, further comprising:
loading, by a runtime environment of the computing device, the policy enforcement enclave using the secure enclave support;
wherein unsealing the encrypted binding identity comprises unsealing the encrypted binding identity in response to loading the policy enforcement enclave.

15. One or more non-transitory, computer-readable storage media comprising a plurality of instructions stored thereon that, in response to being executed, cause a computing device to:
randomly generate, by a firmware enclave of the computing device, a binding identity, wherein the firmware enclave comprises a trusted execution environment;
securely provision, by the firmware enclave, the binding identity to a USB controller of the computing device;
seal, by the firmware enclave, the binding identity to generate an encrypted binding identity;
unseal, by a policy enforcement enclave, the encrypted binding identity to recover the binding identity, wherein the policy enforcement enclave comprises a trusted execution environment;
send, by the policy enforcement enclave, a policy enforcement command to the USB controller, wherein the policy enforcement command comprises the binding identity;
determine, by the USB controller, whether the binding identity of the policy enforcement command matches the securely provisioned binding identity; and
enforce, by the USB controller, the policy enforcement command in response to determining that the binding identity of the policy enforcement command matches the securely provisioned binding identity;
wherein to enforce the policy enforcement command comprises to block configuration changes associated with a USB device coupled to the USB controller, and wherein to block the configuration changes comprises to monitor an internal control transfer ring of the USB controller to identify configuration change requests for the USB device.

16. The one or more non-transitory, computer-readable storage media of claim 15, wherein to enforce the policy enforcement command further comprises to block data transfers associated with a USB device coupled to the USB controller.

17. The one or more non-transitory, computer-readable storage media of claim 15, further comprising a plurality of instructions stored thereon that, in response to being executed, cause the computing device to:
load, by a firmware environment of the computing device, the firmware enclave using secure enclave support of a processor of the computing device in response to a boot of the computing device;
wherein to randomly generate the binding identity comprises to randomly generate the binding identity in response to loading the firmware enclave.

18. The one or more non-transitory, computer-readable storage media of claim 17, further comprising a plurality of instructions stored thereon that, in response to being executed, cause the computing device to:
load, by a runtime environment of the computing device, the policy enforcement enclave using the secure enclave support;
wherein to unseal the encrypted binding identity comprises to unseal the encrypted binding identity in response to loading the policy enforcement enclave.

* * * * *